Aug. 28, 1962 E. D. HOUGEN 3,051,279
METHOD AND APPARATUS FOR SECTIONING
AUTOMOTIVE BODY PANELS
Filed March 31, 1958 2 Sheets-Sheet 1
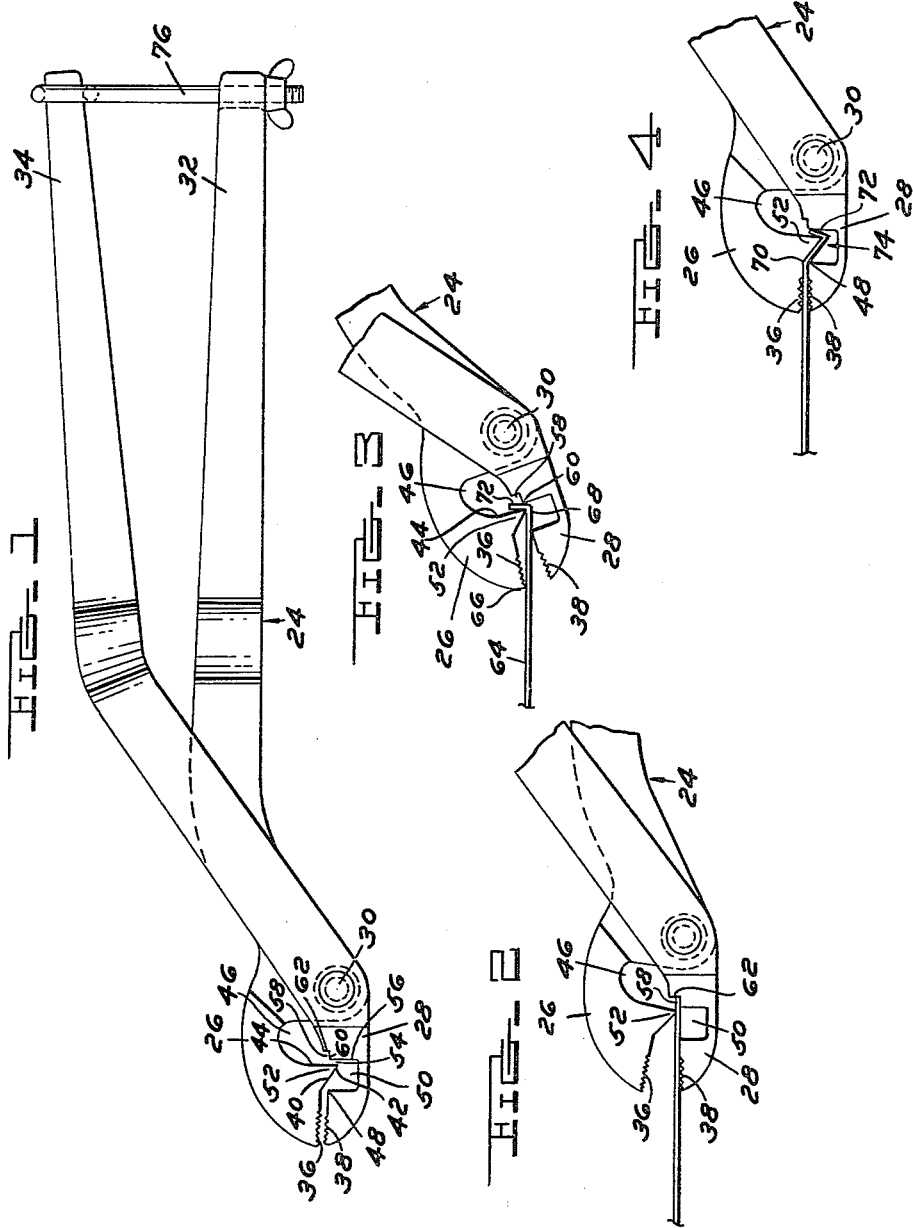
INVENTOR.
EVERETT D. HOUGEN
BY
Barnes, Kisselle, Raisch & Choate
ATTORNEYS Aug. 28, 1962  E. D. HOUGEN  3,051,279
METHOD AND APPARATUS FOR SECTIONING
AUTOMOTIVE BODY PANELS
Filed March 31, 1958  2 Sheets-Sheet 2

INVENTOR.
EVERETT D. HOUGEN
BY
Barnes, Kisselle, Raisch & Choate
ATTORNEYS

# United States Patent Office 3,051,279
Patented Aug. 28, 1962

3,051,279
METHOD AND APPARATUS FOR SECTIONING
AUTOMOTIVE BODY PANELS
Everett D. Hougen, % Blair Equipment Co.,
902 Blair St., Flint, Mich.
Filed Mar. 31, 1958, Ser. No. 725,125
10 Claims. (Cl. 189—36)

This invention relates to a method and apparatus for sectioning automotive body panels and more particularly to a method and apparatus that enable replacing sections of automotive body panels with a minimum of difficulty.

In automotive body repair work, the job of replacing sections of a body panel is, in most instances, a very troublesome one. Putting in sections of body panels that are flat or nearly flat has invariably presented a serious problem because the welding of flat or nearly flat sections of sheet metal has always produced heat distortion and buckling. There is probably no problem that the metal man has that is more difficult, discouraging or impossible than making a butt welded joint in a flat section of a panel. Many times, it is impossible to smooth out, fill or otherwise hide the buckling or distortion that is produced by a butt welded joint in a flat section of a body panel. For this reason, many relatively large body panels are replaced completely in spite of the fact that the damage, although severe, is relatively small. This is especially true of roof panels, quarter panels and door panels.

The cause of this problem of buckling and distortion is weld shrinkage. In any welding operation, there is a tendency for shrinkage; and the undesirable results of such shrinkage are much more prevalent in flat sections than in areas that are reenforced by bends or sharp curves. An understanding of the real cause of weld shrinkage and how it occurs will help to understand how this problem is solved by the method of this invention.

In any welding method, both heating and cooling are necessary phenomena. Heating causes expansion which would be completely relieved and offer no problem upon cooling if the entire panel being welded were heated evenly all over. However, in welding, only a small area is heated and the surrounding unheated portions of the metal resist expansion so that rather than causing uniform expansion throughout the panel, the locally heated area bulges and tends to thicken. By the same token, when the locally heated area cools, uniform contraction throughout the panel cannot take place so that the cooling area tends to pull the adjoining metal toward it.

In the case of welding along a joint, as the weld is formed progressively along the joint, this pulling or stretching effect likewise travels on the panel along the extent of the joint. If a heavy weld bead is laid down in the joint, the pulling effect on cooling is increased even further. This is so for two reasons. The first reason is that the pulling effect is increased because the section size of the locally heated area becomes heavier; and the second reason is that the molten metal added is also expanded to its maximum, and as it cools, it likewise must contract and shrink.

The amount of actual draw or pull resulting from weld shrinkage depends upon several factors. In general, the lesser amount of heat applied, the lesser will be the amount of draw or pull. However, the most important factor affecting this problem of weld shrinkage is the reenforcement or lack of reenforcement along the edges of the weld. A sharp bend close to a weld reenforces the metal so that it tends to hold its shape when heated and forces the weld bead itself to stretch when it cools rather than pulling the adjoining metal together into buckles.

The method of the present invention eliminates substantially the problems heretofore encountered in the case of welding the edges of flat panel sections because it provides the necessary reenforcement along the edges of the weld and because it enables the application of a minimum amount of heat to the joint being welded.

In the drawings:

FIG. 1 is a side elevational view of a tool constructed in accordance with the present invention for practicing the improved method.

FIGS. 2, 3 and 4 are fragmentary views of the tool illustrated in FIG. 1 showing the manner in which the tool is utilized for preparing the edges of the panels to be joined in accordance with the present method.

Figure 5:
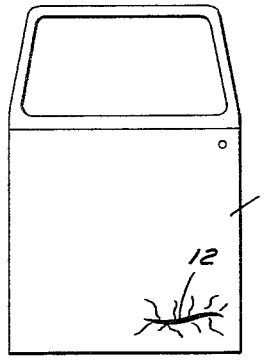
FIG. 5 shows an automotive body door that is severely damaged at one portion thereof.
Figure 6:
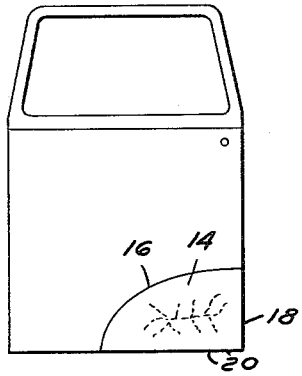
FIGS. 6, 7 and 8 show the progressive steps in accordance with the present invention for repairing the damage shown in FIG. 5.
Figure 7:
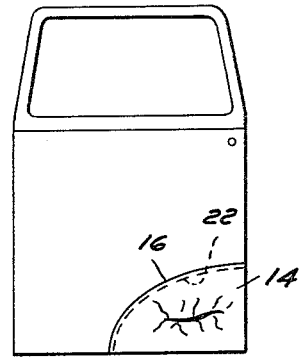
Figure 8:
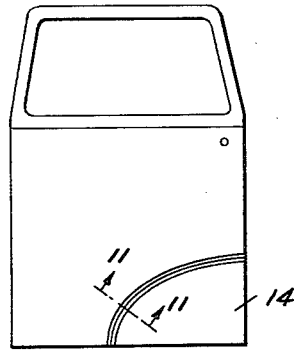
Figure 9:
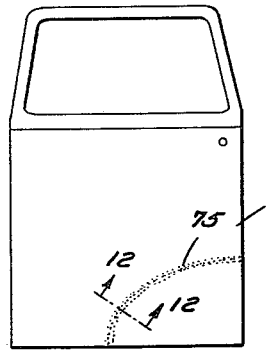
FIG. 9 is a view of the door completely repaired.

Referring first to FIG. 5, a door 10 is there illustrated with rather severe damage 12 adjacent one of the lower corners thereof. By means of the present invention, the door illustrated, wherein the damage may be a severe tear surrounded by severely bent metal, can be repaired as distinguished from being replaced. In repairing this door in accordance with the present invention, the first step is to cut out from a piece of sheet metal stock a repair panel of a size adequate to overlap on all sides the damaged portion of the door panel. This repair panel is indicated 14 in FIG. 6. The repair panel, which may be cut from an old door or other body panel, should have approximately the same crown as the damaged portion of the door. The repair panel is placed over the damaged area of the door and its outline is scribed thereon.

In the illustration shown, the repair panel has an arcuate edge 16 and two straight edges 18 and 20 which match the side and bottom edges of the door. After the arcuate edge 16 is scribed on the door, the damaged portion of the door is removed by cutting from the door a panel section which is slightly smaller than the repair panel 14. For example, the door panel may be cut along the broken line 22.

For the purposes of description and for the purpose of illustrating the method of the present invention, we shall consider the repair job as one involving the welding of the repair panel 14 to the door panel in generally edge-to-edge relation along the arcuate edges 16 and 22. The straight edges 18 and 20 can be welded or otherwise attached to the corresponding edges of the door by any suitable means. After the damaged area of the door is removed, the arcuate edges 16, 22 are bent into the shape illustrated in FIGS. 10, 11 and 12. The means for bending these edges into the shape illustrated comprises the tool illustrated in FIGS. 1 through 4.

The tool, which is generally designated 24, comprises a pair of jaws 26, 28 that are pivotally connected as at 30 and provided with extensions forming handles 32 and 34, respectively. The jaws 26, 28 are fashioned with serrated clamping faces 36, 38 which, when the jaws are closed, are juxaposed and adapted to grip opposite faces of a sheet metal panel. At the inner end of the serrated face 36, the upper jaw 26 is provided with an angularly downwardly inclined face portion 40 which terminates as at 42 in a substantially straight, sharp edge or corner that is generally parallel to the pivotal axis 30. The edge 42 is defined in part by the vertically extending face 44 of a clearance space 46 formed inwardly of the serrated face 36 of upper jaw 26.

Adjacent the inner edge 48 of the serrated face 38 on the lower jaw 28, there is provided a clearance cavity or recess 50. Cavity 50 has a depth and a dimension longitudinally of the tool that is greater than the corresponding dimensions of the pointed projection 52 on the upper jaw that is defined by the faces 40 and 44. Thus, in the closed position of the jaws, there is a clearance space 54 between the face 44 of projection 52 and the rear or inner face 56 of cavity 50. Along the upper edge of face 56, the lower jaw 28 is provided with a notch 58. The face 60 of notch 58 is generally coplanar with the serrated face 38 of lower jaw 28, while the face 62 of notch 58 which forms a stop face is generally perpendicular to face 60.

Figure 10:
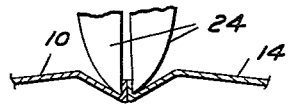
FIG. 10 illustrates the manner in which the sectioned door panel and the repair panel are clamped together for welding.
Figure 11:
FIG. 11 is a sectional view taken along the lines 11—11 in FIG. 8.
Figure 12:
FIG. 12 is a sectional view taken along the lines 12—12 in FIG. 9.

In using the tool 24 to bend the edges of the two panels into the configuration shown in FIGS. 10, 11 and 12, the edge of the panel to be bent is inserted between the jaws with the free edge abutting the stop face 62. The handles 32, 34 are then squeezed together to an extent such that the top face 64 of the panel being bent contacts the front edge 66 of the serrated face 36 of the upper jaw. The straight edge 42 of the projection 52 thus produces a bend as at 68. The tool is moved progressively along the edge to bend the edge progressively to the shape shown in FIG. 3. After the whole edge or substantially the whole edge is bent to the configuration shown in FIG. 3, the tool is then again manipulated along the bent edge in the progressive manner described above; but the handles 32, 34 are squeezed sufficiently to bring the jaws 26, 28 to the fully closed position illustrated in FIG. 4. It will be observed that clearance between recess 50 and projection 52 is adequate to accommodate any noise deadening material that may have been applied to the inner face of the panels being bent.

From a comparison of FIGS. 3 and 4, it will be observed that the latter operation causes a second bend 70 to be formed along the rear edge 48 of the serrated face 38 on the lower jaw; and the bend 68 which was previously formed is continued somewhat by this second operation so that the flange 72 along the edge of the panel is drawn into the clearance space 54 of the tool. The clearance space 54 is slightly wider than the thickness of the panel being formed (FIG. 4); and as a consequence, the flange 72 is slightly non-perpendicular to the plane of the panel being bent.

I have found that best results are obtained when the plane of flange 72 is inclined to the plane of the panel proper at an angle of about 85° to 89°. The tool thus provides along the edge of the panel a V-shaped groove or channel 74, the free edge portion of which is defined by the flange 72. The vertical extent of flange 72 is determined by the distance between the corner 42 of the upper jaw 26 and the stop face 62 on the lower jaw 28. In the channel 74 formed, it will be noted that flange 72 terminates in a plane spaced below the plane of the panel.

The formation of the channel 74 along the arcuate edges 16, 22 of the door and repair panels reduces the dimensions of these panels a predetermined amount so that although the repair panel 14 was initially oversize with respect to the opening resulting from the removal of the damaged portion of the door, the repair panel with its channel 74 can be fitted accurately within the opening defined in part by the channeled edge 22. In many instances, of course, because of slight errors in cutting, the repair panel 14 with the channel 74 around its arcuate edge will not fit perfectly within the opening defined by the channeled edge 22 of the door panel; and if this occurs, the body man can close the gaps between these edges by hammering the two flanges 72 outwardly the desired extent along the necessary portions of the two edges. On the other hand, if the repair panel is oversize along portions of the edge 16, the flanges 72 can be hammered inwardly wherever necessary to produce the desired close fit.

In any event, it will be seen that the formation of the channel 74 in the manner described and illustrated enables the operator to produce a relatively close fit between the flanges 72 when the repair panel 14 is inserted into the opening formed by removal of the damaged portion of the body panel. It is desirable to have the two flanges 72 fitting rather closely along the adjoining edges to be welded, but a perfect fit throughout the extent of these edges is not absolutely necessary.

With the operations described above performed on the two panel sections, the operator is now ready to weld the two panel sections together along the interfitting arcuate edges which have been provided with the channeled formations. The two panel sections should be clamped together so that the plane of the repair panel 14 will conform to and be flush with the plane of the door panel. The flanges 72 provide an excellent means for clamping these panel sections together. They may be held in clamped relation by the tool illustrated in FIGS. 1 through 4. The flanges 72 may be clamped between the serrated faces 36, 38 and held in this relation by means of the clamp bolt 76 provided at the ends of handles 32, 34. Other forms of clamps may be used if desired.

In this connection, it will be observed that when the two flanges 72 are clamped together, the two panels are bowed slightly upwardly or outwardly. This results from the fact that the flanges 72 are slightly non-perpendicular to the planes of these panels. In FIG. 10, the two panels are shown in clamped relation and the bow imparted thereto is shown to an exaggerated extent for the purposes of illustration.

After the two panels are clamped together at several locations along their adjacent edges in the manner illustrated in FIG. 10, they are ready for welding. The welding is preferably effected by directing a properly adjusted welding flame against the upper end edges of the flanges 72. For best results, the flame should be evenly divided on both sides of the seam between the two flanges 72. The two flanges should be tacked together in this manner at critical areas; and thereafter, additional tack welds in between can be made. If maximum strength is desired, after the two panels are tack welded together, a solid fusion joint may be provided by welding along the length of the entire seam. Although the use of a gas welding flame alone for effecting welding between the upper ends of the two flanges 72 is preferred, the weld can, if desired, be made by other means such as spot welding, arc welding or the use of any of the low temperature brazing rods now marketed. In any event, it will be appreciated that the weld will be disposed below the outer or upper face of the panels being welded. This is illustrated in FIG. 11. It will also be noted that by fusing these edges together as described, the weld bead 73 thus formed mushrooms so that it overhangs the exposed faces of flanges 72.

After the weld between the upper edges of the flanges 72 is made, the joint is cleaned by any suitable means such as a disc sander or a grinder. The channels 74 are then tinned and a layer of body solder 75 is applied to the recess formed by the channels in a conventional manner such as to conceal the joint and provide the panel with a smooth, continuous surface. This step is illustrated in FIG. 12. The mushroom weld bead 73 provides an excellent anchoring means for the mass of body filler 75.

In connection with the step of welding the two flanges 72 together, the importance of forming the flanges 72 so that they are slightly non-perpendicular to the plane of the panels will be appreciated. When the two panels are clamped together as shown in FIG. 10, an outward or upward bow is imparted to the panels. Thereafter, when heat is applied to the edges of the flanges 72, any expansion that takes place in the panels themselves will result in a further bowing of the panels in an outward or upward direction. A slight amount of bowing due to expansion is difficult to eliminate entirely. By fashioning the flanges as described and clamping them together in the manner illustrated in FIG. 10, an outward bowing of the panel is assured. As long as the panel bows outwardly, it can be hammered back into the desired plane without any difficulty.

If the panel were to bow inwardly, it might be difficult to hammer it outwardly because the rear side of the panel being welded might be inaccessible. It will be appreciated that with the method of this invention, access to only the exterior face of the panel is required. The panels are clamped together from the exterior face; and since the flanges 72 are in contact, there is substantially no gap between them and thus, in many cases, the upholstery on the inside of the panel need not be removed because the flame of the welding torch will never extend through to the inner face of the panels. The necessity for access to only the exterior face of the panel being repaired is an important feature of the present invention.

The amount of distortion or buckling resulting from repairing a body panel in the manner described is substantially eliminated primarily for two reasons. In the first place, the flanges 72 are interfitted and disposed such that it is only necessary to apply a flame to the upper edges of these flanges in order to effect a weld. Thus, a minimum amount of heat is required to produce the welded joint. Obviously, these upper edges of the flanges 72 are brought to a fusion temperature much more rapidly than is the case where the welding flame is directed against a flat panel. Another reason why distortion is eliminated is because the joint being welded is reenforced by the two bends at 68 and 70 along each side of the weld. These two bends confine substantially all the expansion and the contraction to the two channels 74 rather than permitting the surrounding areas of the panels to stretch and buckle. Thus, the panels themselves are not distorted; and any buckling or distortion that might occur within the channels 74 is readily concealed when they are filled with body solder.

As a result, a minimum of time is required to section a body panel in accordance with the present invention; and, at the same time, the finished job does not show any evidence of having been repaired. In view of the fact that the buckling and distortion is substantially eliminated, it is only necessary to fill the channels 74 with body solder or any of the other types of filler material; and as a consequence, I have found that considerably less filler material is required than is the case where panels are butt welded together by conventional methods such as using brazing rod.

In the foregoing description and appended claims, I have used the terms "upwardly" and "outwardly" in reference to the panels to designate the exterior side thereof. Likewise, the terms "downwardly" and "inwardly" are used to designate the inner side of the panels.

I claim:

1. The method of butt joining sheet metal panel sections by welding which comprises bending the panels to form upwardly opening channels on each panel along the edge to be joined, each channel being formed by bending the edge portion of the panel downwardly below the plane of the panel along a line generally parallel to the panel edge to be joined and bending a portion of the downwardly bent edge portion upwardly such that the free edges of the upwardly bent portions terminate in a plane below the upper face of the panels a like extent on each panel and the free edge portions of the channels extend in a plane that is disposed generally transversely of the plane of the panel adjacent to the edge to be joined, the upwardly bent portion of each channel being slightly inclined to a plane perpendicular to the plane of the panel in a direction toward the free edge thereof, arranging the panels in abutting relation so that the two channels extend side by side along the joint to be formed and on the same side of the planes of the panels and with the extreme free edges of the channel in generally contacting relation and terminating in the same plane and with said free edge portions of the channels diverging slightly in a direction downwardly away from the plane of the panels, squeezing said diverging edge portions together to impart a slight upward bow to the panels, fusing said free edge portions together along the extent of the joint thus formed so that the two panels are joined together along the adjacently extending channels and thereafter applying a filler material to the recesses formed by the channels to conceal the joint thus formed.

2. The method called for in claim 1 wherein said fusing includes the step of applying heat to said free edge portions by means of a flame directed generally perpendicularly against the extreme end faces of the said free edge portions of the channels from the upper side of the panels.

3. The method of repairing an automotive body panel which is severely damaged at a localized area thereof which comprises cutting out a portion of said body panel which surrounds and includes said damage, forming a repair panel to generally the same configuration of the cut out portion of the body panel but slightly oversize, then forming along the edges to be joined of the repair panel and the body panel channels disposed below the planes of the panels with the free edge portions of the channels extending toward and generally transversely of the plane of the panels, the channels being dimensioned in cross section such that the repair panel with its channeled edge interfits with the opening cut in the body panel, fitting the repair panel within said opening with the plane of the repair panel generally conforming to the plane of the body panel and with the channeled free edge portions of the panels generally contiguous, holding said repair panel in said last mentioned position and while said repair panel is so held, applying heat to the adjacent portions of the free edges of the two channels to fuse them together and thereafter filling the recess formed at the joint by said two channels with a body filler material to thereby conceal the joint.

4. The method called for in claim 3 wherein the step of fitting the repair panel within the opening cut in the body panel includes the step of bending the side walls of the channel on at least one of the panels so as to change the width of the channel and thereby provide a more accurate interfit between the two panels.

5. The method called for in claim 3 wherein the channels are formed so that when assembled as described, the free edge portions of the channels on the two panels are in generally contacting relation at the extreme free edges thereof and are spaced apart slightly in a plane below said extreme free edges and including the step of squeezing the free edge portions of the adjacent channels together prior to fusing such as to impart a slight upward bow to the panels at the areas thereof adjacent the joint being formed.

6. The method called for in claim 3 wherein the free edge portions of the channels extend in a plane generally perpendicular to the planes of the panels.

7. The method called for in claim 3 wherein heat is applied to the free edge portions of the adjacent channels by means of a flame disposed above the panels and directed primarily at the extreme end faces of said free edge portions of the channels.

8. The method called for in claim 7 wherein the application of said flame to a localized area of the two adjacently positioned edge portions of the channels is continued for a period of time only sufficient to fuse said edge portions into a weld bead at said free end faces.

9. The method of repairing an automotive body panel which is severely damaged at a localized area thereof which comprises cutting out a portion of said body panel which surrounds and includes said damage, forming a repair panel to generally the same configuration of the cut out portion of the body panel but slightly oversize, then forming along the edges to be joined of the repair panel and the body panel channels disposed below the planes of the panels with the free edge portions of the channels extending toward and generally transversely of the plane of the panels, the channels being dimensioned in cross section such that the repair panel with its channeled edge interfits with the opening cut in the body panel, fitting the repair panel within said opening with the plane of the repair panel generally conforming to the plane of the body panel and with the channeled free edge portions of the panels generally contiguous, holding said repair panel in said last mentioned position and while said repair panel is so held, joining the adjacent portions of the free edges of the two channels together by means involving heating of said free edges and thereafter filling the recess formed at the joint by said two channels with a body filler material to thereby conceal the joint.

10. In combination, a pair of sheet metal panels having contiguous edge portions forming a joint, said edge portions each being channel-shaped with the channel disposed below the plane of the panel, said channels each having adjacently positioned free edge portions terminating in a plane below the plane of said panels, a fused metal connection between said free edge portions and serving to secure said panels together and a layer of plastic filler material solidified in situ filling said channels and concealing said fused metal connection, said channels each comprising a pair of said walls, one of which comprises the free edge portion of the channel, the last mentioned side wall of each channel lying in a plane disposed generally perpendicularly to the plane of the panel and said fused metal connection comprising a weld bead at the upper ends of the last mentioned side walls which overhangs the last mentioned side walls of said channels.

References Cited in the file of this patent

UNITED STATES PATENTS

| | | |
|---|---|---|
| 319,228 | Goodman | June 2, 1885 |
| 1,158,307 | Schmidt | Oct. 26, 1915 |
| 1,263,739 | Brown | Apr. 23, 1918 |
| 1,420,016 | Bingay | June 20, 1922 |
| 1,486,607 | Reissig | Mar. 11, 1924 |
| 1,810,005 | Burnish | June 16, 1931 |
| 2,256,130 | Trachsel | Sept. 16, 1941 |
| 2,412,972 | Dean | Dec. 24, 1946 |
| 2,504,509 | Erickson | Apr. 18, 1950 |
| 2,751,109 | Moore | June 19, 1956 |
| 2,811,065 | Johnson | Oct. 29, 1957 |